US009600796B2

(12) United States Patent
Schöning et al.

(10) Patent No.: US 9,600,796 B2
(45) Date of Patent: Mar. 21, 2017

(54) ONTOLOGY-BASED EMERGENT ORDERING SYSTEM AND METHOD

(71) Applicant: Software AG, Darmstadt (DE)

(72) Inventors: Harald Schöning, Dieburg (DE); Juliane Harbarth, Griesheim (DE)

(73) Assignee: Software AG, Darmstadt (DE)

( * ) Notice: Subject to any disclaimer, the term of this patent is extended or adjusted under 35 U.S.C. 154(b) by 653 days.

(21) Appl. No.: 14/104,683

(22) Filed: Dec. 12, 2013

(65) Prior Publication Data
US 2015/0170071 A1 Jun. 18, 2015

(51) Int. Cl.
*G06F 17/30* (2006.01)
*G06Q 10/06* (2012.01)
*G06Q 30/02* (2012.01)

(52) U.S. Cl.
CPC ..... *G06Q 10/067* (2013.01); *G06F 17/30734* (2013.01); *G06F 17/30398* (2013.01); *G06F 17/30569* (2013.01); *G06F 17/30867* (2013.01); *G06Q 30/02* (2013.01)

(58) Field of Classification Search
CPC .. G06Q 30/02; G06Q 10/067; G06Q 30/0601; G06F 17/30734; G06F 17/30569; G06F 17/30867; G06F 17/30657
USPC ....... 707/706, 736, 737, 741, 794; 705/27.1, 705/348; 717/127, 174
See application file for complete search history.

(56) References Cited

U.S. PATENT DOCUMENTS

| 8,438,074 | B2* | 5/2013 | Serbanescu | ........ G06Q 30/0601 705/26.4 |
| 8,615,585 | B2* | 12/2013 | Deng | ................ G06F 17/30734 707/797 |
| 8,694,347 | B2* | 4/2014 | Kennis | .............. G06F 17/30569 705/7.11 |
| 2003/0046201 | A1* | 3/2003 | Cheyer | .................. G06Q 30/06 705/35 |
| 2004/0162741 | A1* | 8/2004 | Flaxer | .................... G06Q 10/10 705/7.26 |
| 2006/0053120 | A1* | 3/2006 | Shum | ..................... G06Q 30/02 707/999.1 |
| 2010/0030734 | A1* | 2/2010 | Chunilal | .......... G06F 17/30867 707/770 |
| 2011/0035650 | A1* | 2/2011 | Jardine-Skinner | ......................... G06F 17/30011 715/205 |

(Continued)

OTHER PUBLICATIONS

Sonntag, Daniel. "A Methodology for Emergent Software." DFKI Technical Report. German Research Center for Artificial Intelligence, Saarbruecken, Germany. Sep. 2010.

*Primary Examiner* — Dangelino Gortayo
(74) *Attorney, Agent, or Firm* — Posz Law Group, PLC

(57) ABSTRACT

An method and system for handling service interdependencies in an ontology-based emergent environment that prompts service partners to provide both service type information and service parameters through a partner-portal so that the registered services can be classified into ontologies which allow parameters and rules to be associated with each registered service. The ontology modification information is generated by identifying an interdependency, manifesting the interdependency, generating new rules and parameters, and adding the new rules and parameters to the relevant service categories within the ontology database. The service partners are asked about these new parameters when registering a service.

20 Claims, 11 Drawing Sheets

(56) References Cited

U.S. PATENT DOCUMENTS

2012/0296893 A1* 11/2012 Nadgir .............. G06F 17/30554
                                                                   707/722

\* cited by examiner

ONTOLOGY-BASED EMERGENT ORDERING SYSTEM AND METHOD

TECHNICAL FIELD

The technical field relates in general to emergent software systems.

BACKGROUND

In the area of emergent systems, where different service providers can offer services to a customer who in turn can compose an order combining the different services, structuring and managing interdependencies between these services presents a challenge.

Services are typically categorized into taxonomies, which serve the single purpose of aiding the classification of services. Accordingly, interdependencies between services are hard-coded and therefore static.

Emergent software systems are typically established by and shared by more than one participant. Often one participant establishes the framework and then allows other participants to deploy components into the framework. Participants owning the components deployed to the platform are constantly capable of providing, updating, and deleting their components. Apart from making the system change its behavior unexpectedly, this feature also enables the system to perform tasks, by unexpected combinations of components that were not originally possible or intended by any of the component suppliers. Systems that function in this manner are referred to as "emergent."

Emergent systems that are designed to execute a process chain that produces certain products typically involve a partner portal, a customer portal, and a steering component. The partner portal allows parties that can fulfill at least one of the steps in an overall process, to publish services to the system. The customer portal displays the aggregated partner offerings to potential customers so that a customer can configure a customized offering by choosing among the options provided by the registered partners for each step. The steering component is connected to both portals and steers the overall process by aggregating partner offerings into the customer portal and delegating customer orders.

One of the problems with current emergent systems that are designed to execute a process chain is that the decisions the customer has to undertake are presented as if they are largely independent of one another and that any interdependency between categories is static.

For example, in the case of a sample process chain for the production of boxes of chocolates there are many separate process steps, including, for example, forming items out of a certain material, covering them with icing, placing decorations on top, covering them in paper, putting them in a box, etc. It may be the case that not all of the materials of a to-be-iced item can endure the temperature that a certain icing requires to be sufficiently liquid. Thus, a customer may end up using a current emergent system portal to order, for example, marzipan chocolates covered with dark chocolate though the overall-process might exclude this case.

Non-emergent systems, that contain service categories and customer choices by hard-coded means, would not have this issue because the interdependencies between the service categories are, indeed, static. However, emergent systems are dynamic with respect to service categories, often influenced by numerous parties. This dynamism often leads to problems and conflicts with respect to the interdependency of service categories.

Another problem occurs with current catalogue-based ordering systems that allow customers to choose from a large catalogue of goods where the customer can select products not only via brand name, but also based on some properties. For example, an electronic component provider catalogue may include a property description, such as "needs 5V power supply." Current systems may not detect if the customer-selected components are incompatible with one another.

For example, there are different types of plugs to connect systems to one another, and the components selected by the customer might rely on different plugging systems. This incompatibility is not detected by current systems and may not be discovered until the customer tries to assemble the components.

One or more embodiments discussed herein can address these problems by extending emergent behavior to the interdependency handling and detecting/resolving incompatibility issues.

SUMMARY

Accordingly, an embodiment provides a system, method and/or non-transitory computer readable medium for handling service interdependencies in an ontology-based emergent environment that prompts service partners to provide both service type information and service parameters through a partner-portal so that the registered services can be classified into ontologies which allow parameters and rules to be associated with each registered service. The ontology modification information is generated by identifying an interdependency, manifesting the interdependency, generating new rules and parameters, and adding the new rules and parameters to the relevant service categories within the ontology database. The service partners can be asked about these new parameters when registering a service.

Accordingly, an embodiment provides an ontology-based emergent computer software system. The computer system comprises a partner-portal, a customer-portal, and a steering component. The partner-portal is configured to receive and send partner service registration information, receive customer order information, and receive ontology database information. The customer-portal is configured to receive and send the customer order information, receive the ontology database information, and receive aggregate service offerings. The steering-component, which is configured and operated by the provider, is connected to the partner-portal and the customer-portal.

The steering-component comprises an ontology database configured to receive ontology modification information and send the ontology database information; a service registry configured to receive the partner service registration information and send the aggregate service offerings; and an order processing system configured to receive and send the customer order information.

The steering-component is configured to generate ontology modification information by identifying an interdependency, manifesting the interdependency, generating new rules, generating new parameters based on the new rules; and adding the new rules and the new parameters to service categories within the ontology database.

The partner service registration information sent by the partner-portal comprises service category information and parameter information.

According to another embodiment, the ontology database comprises the service categories; the rules; and the parameters.

According to yet another embodiment, the provider generates the ontology modification information.

According to another embodiment, the provider accepts and adds the customer registration information to the aggregate service offerings.

An embodiment provides a computer system that comprises a partner-portal, a customer-portal, and a steering component. The partner-portal is configured to receive and send partner service registration information, receive customer order information, and receive ontology database information. The customer-portal is configured to receive and send the customer order information, receive the ontology database information, and receive aggregate service offerings. The steering-component, which is configured and operated by the provider, is connected to the partner-portal and the customer-portal.

The steering-component comprises an ontology database configured to receive ontology modification information and send the ontology database information; a service registry configured to receive the partner service registration information and send the aggregate service offerings; and an order processing system configured to receive and send the customer order information. The steering-component is configured to generate ontology modification information by receiving interdependency information from the partner-portal, manifesting the interdependency, generating new rules, generating new parameters based on the new rules; and adding the new rules and the new parameters to service categories within the ontology database. The partner service registration information sent by the partner-portal comprises service category information and parameter information.

An method and/or system for handling service interdependencies in an ontology-based emergent environment includes receiving, by a processor, in a service registry of a steering component, from a partner-portal, partner service registration information which includes, for a service offering, service category information and service parameter information; aggregating, by the processor, the service offerings from partners; and sending, by the processor, the aggregate service offerings to a customer-portal; and storing, by the processor, in an ontology database, ontology modification information and ontology database information. The steering component generates the ontology modification information by interacting with a user to receive, as ontology modification information, (i) an identification of an interdependency between the service offerings, (ii) new rules for service offerings which are interdependent, and (iii) new parameters for the service offerings which are interdependent based on the new rules; and stores the new rules and the new parameters in the ontology database to service categories within the ontology database which correspond to the service category information from the partner service registration information. The aggregate service offerings which are sent to the customer-portal include the ontology database information and the ontology modification information.

An embodiment can provide for manifesting the interdependency between the service offerings as a machine-readable rule with the parameters within the service category.

An embodiment can provide for manifesting, by the processor, in the ontology database, the interdependency between the service offerings as a new rule-pair of a human-readable rule and a machine-readable rule.

Yet another embodiment can provide for receiving, in an order processing component, from a customer-portal, customer order information which indicates ordered service offerings based on the aggregate service offerings; and determining, by the processor, whether the ordered service offerings in the customer order information are an invalid order based on (i) interdependency between service offerings, (ii) rules for the service offerings which are determined to be interdependent, and (iii) violations of the parameters in the rules for the service offerings which are determined to be interdependent.

Still another embodiment can provide for receiving, by a customer-portal processor which is complementary to the steering-component, the aggregate service offerings; notifying, by the customer-portal processor, a user of all options for service offerings and of restricted options for service offerings based on the rules; interacting, by the customer-portal processor, with the user to obtain customer order information which indicates ordered service offerings based on the aggregate service offerings; and sending, by the customer-portal processor, the customer order information to the steering component to determine whether the order is invalid based on the ontology database information and ontology modification information.

Yet another embodiment provides for interacting, by a partner-portal processor which is complementary to the steering-component, with the user to obtain the partner service registration information; interacting, by the partner-portal processor, with the user to obtain (i) the identification of the interdependency between the service offerings, (ii) the new rules for service offerings which are interdependent, and (iii) the new parameters for the service offerings which are interdependent based on the new rules.

In yet another embodiment, the ontology database information comprises: the service categories; the rules; and the parameters.

Another embodiment calls for receiving, by the processor, a request for a new service; determining, by the processor, whether a service category for the new service already exists; when the service category is determined to exist, registering the new service with the service category; when the service category is determined to not already exist: registering the new service as an existing service with a deviation to the existing service; interacting, by the processor, with a provider-user to determine whether to add a new category corresponding to the new service; activating, by the processor, the new service with the deviation as the new category when the determination is to add the new category; and activating, by the processor, the new service categorized as the existing service when the determination is to not add the new category.

Another embodiment provides for accepting and adding, by the processor, customer registration information to the aggregate service offerings.

Yet another embodiment provides a non-transitory computer-readable medium which can perform a method according to one or more of these embodiments.

One, or a combination of more than one, or all, of the above embodiments, can be combined and provided as a single embodiment.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

Figure 1:
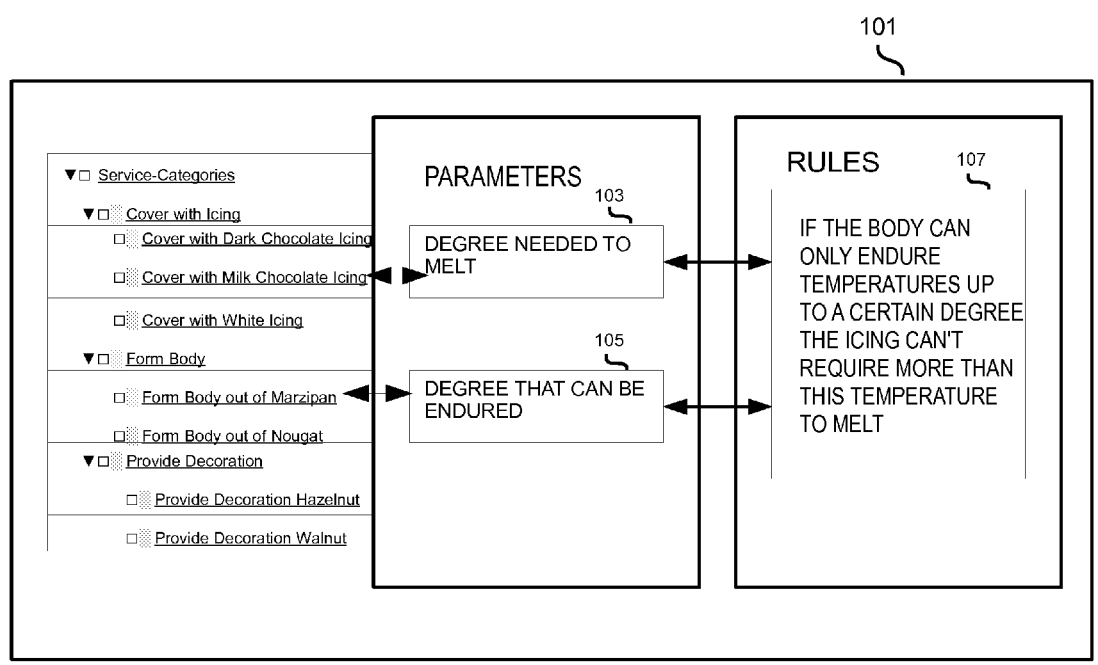
FIG. 1 is a block diagram illustrating an example of an ontology subset.

In overview, the present disclosure concerns handling service interdependencies in an ontology-based emergent environment, optionally in connection with an ordering system, that prompts service partners to provide both service type information and service parameters through a partner-portal so that the registered services can be classified into ontologies, which allow parameters and rules to be associated with each registered service. The ontology modification information is generated by identifying an interdependency, manifesting the interdependency, generating new rules and parameters, and adding the new rules and parameters to the relevant service categories within the ontology database. The service partners are asked about these new parameters when registering a service.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

<Definitions>

The claims may use the following terms, which are defined to have the following meanings for the purpose of the claims herein. Other definitions may be specified in this document.

The term "computer system" or "computer" used herein denotes a device sometimes referred to as a computer, laptop, personal computer, personal digital assistant, notebook computer, personal assignment pad, server, client, mainframe computer, or evolutions and equivalents thereof.

The term "emergent ordering system" is used herein to denote a software system that can be changed unexpectedly, enabling the system to perform tasks by unexpected combinations of components that may not have been possible or intended by component suppliers.

The term "ontology" is used herein to denote structural frameworks for organizing information. Ontologies are used in artificial intelligence, the Semantic Web, systems engineering, software engineering, biomedical informatics, library science, enterprise bookmarking, and information architecture as a form of knowledge representation about the world or some part of it. The creation of domain ontologies is also fundamental to the definition and use of an enterprise architecture framework. The core meaning within computer science is a model for describing the world that consists of a set of types, properties, and relationship types. There is also generally an expectation that the features of the model in an ontology should closely resemble the real world. Additional discussion with regard to ontologies and the term "ontology" is provided below in connection with FIG. 15.

The term "taxonomy" is used herein to denote the practice and science of classification of things or concepts, including the principles that underlie such classification.

<End of Definitions>

As further discussed herein below, various inventive principles and combinations thereof are employed to provide a system and/or method for handling service interdependencies in an ontology-based emergent environment to be applied to a process that produces certain products. Participants can be either customers or partners offering services in a field, for example in the area of chocolate making. These participants could be classified as platform users and not as platform administrators. Yet, their interactions may still have the power to change the rules of the system or to adapt the system without having any administrator rights. The overall system can be run by a platform provider.

Service providers can offer their services via a partner-portal. By requesting not only service types (taxonomy) but also service parameters and constraints (also referred to herein as rules), the partner-portal can classify the services in ontologies, thus allowing parameters and rules to be associated with each service. A corresponding customer portal allows for the services to be composed into an order. When an order is composed by a customer, interdependencies are checked dynamically. Because the service ontologies include these rules and parameters, the order is checked as it is being created, blocking service compositions that cannot be combined in practice (or at least providing a notification about them). This means that the service providers (rather than the portal provider) can specify the service constraints and thus alter the behavior of the ordering system.

Further in accordance with exemplary embodiments, there is provided an emergent system that is designed to execute a process chain that produces certain products, for example boxes containing chocolates. Participants in the above sense can be either customers or partners offering services, for example in a specific service area, in this example the area of chocolate making. These participants could be classified as platform users and not as platform administrators. Yet, their interactions still have the power to change the rules of the system (i.e. adapt the system) without having any administrator rights. The overall system can be run by a platform provider.

The sample process chain for the production of product, such as chocolates (used as a convenient example) involves lots of separate process steps. For boxes of chocolates these are, for example, forming items of a certain material, covering them with some icing, eventually putting some adorations on top, covering in paper, putting in a box, etc. The software-system should enable its provider to distribute the production process among more than one party. For this purpose, the provider can offer a so-called partner-portal that allows parties that can fulfill at least one of the steps involved in the overall process, to publish services to the system if applicable.

On the other side, the system offers a so-called customer-portal that exhibits the aggregated partner offerings to potential customers. A customer can then configure a customized offering by choosing among the options provided by the registered partners for each step.

A steering component can be connected to both the customer-portal and the partner-portal. The steering component can be operated by a provider to steer the overall process. This can include a first draft of necessary process steps that also suggests a suitable sequence in which the steps are to be executed. The component assembles the partner's offerings to what the customer portal will show. This means that this component by viewing the partners offerings, decides, which process steps are currently part of the overall process and which offerings for each step are to be presented in the customer-portal. Secondly, the steering component can receive the customer's orderings to steer the execution of the overall process by delegating the separate process steps to selected partners.

Referring now to FIG. 1, a block diagram illustrating an example of an ontology subset 101 will be discussed and described. FIG. 1 provides a summary of several embodiments of a system and method for the ontology based emergent ordering system and method. This diagram illustrates the subset of an ontology consisting of the earlier described taxonomy example pertaining to the production of boxes of chocolates. Of course, this system and procedure is not limited to chocolates which are merely a convenient example for illustrating the principals. In this example, there are two parameters, parameter 103 for the degree needed to melt milk chocolate and parameter 105 for the degree that can be endured by marzipan bodies, and a rule 107 that formulates a problem. Similar to the way that service categories are handled, the additional concepts in this ontology may stem from different system components (partner, provider, customer).

Figure 2:
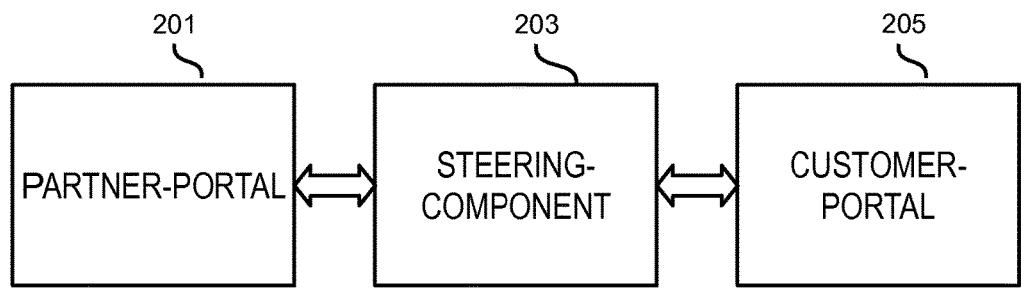
FIG. 2 is a block diagram illustrating the data flow between the partner-portal, the steering-component, and the customer-portal.

Referring now to FIG. 2, a block diagram illustrating the data flow between the partner-portal, the steering-component, and the customer-portal will be discussed and described. The software-system should enable its provider to distribute the production process among more than one party. For this purpose, the provider offers a so-called partner-portal 201 that allows parties that can fulfill at least one of the steps involved in the overall process, to publish services to the system if applicable.

On the other side, the system offers a customer-portal 203 that exhibits the aggregated partner offerings to potential customers. A customer can then configure a customized offering by choosing among the options provided by the registered partners for each step.

The third system component, steering-component 205 is connected to both portals. This component, run by the provider, steers the overall process. This can include a first draft of necessary process steps that also suggests a suitable sequence in which the steps are to be executed. The steering-component assembles the partner's offerings to dictate what the customer portal will display. By viewing the partner's offerings, the steering-component 205 decides which process steps are currently part of the overall process and which offerings for each step are to be presented in the customer-portal 203. Secondly, the central steering-component 205 receives the customer's orderings to steer the execution of the overall process by delegating the separate process steps to selected partners. Both processes, the aggregation of partner offerings into the customer portal and the delegation of customer orders, can be automatic, semi-automatic or completely manual.

For the purpose of distributing the production process, the provider offers a partner-portal that allows parties that can fulfill at least one of the steps involved in the overall process, to register to the system. Registering here means that the potential partner provides information to describe itself, and to name process steps that can be undertaken and under a variety of conditions. For example, a potential partner may disclose as follows: "We are a company that can cover items in icings of two sorts and this will take us one hour per 1000 items."

Further information can be provided to potential partners concerning which services would be appropriate to pertain to the overall production process. Additionally, to make the services categorization machine-readable, the provider can publish a service categorization taxonomy that allows partners to publish their services as being pertinent to one or more relevant categories.

Figure 3:
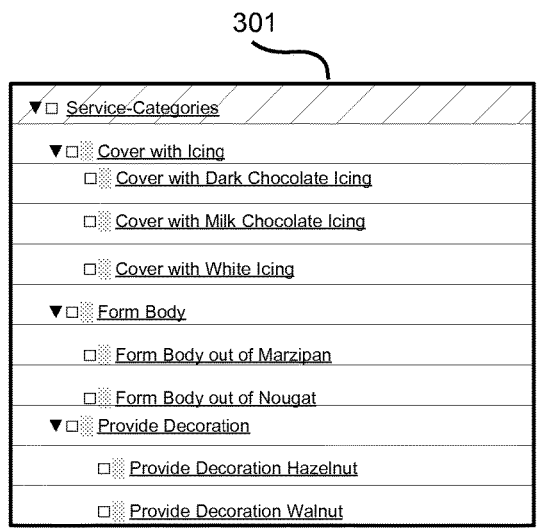
FIG. 3 is an excerpt of a taxonomy for a chocolate-box production process.

Referring now to FIG. 3, an excerpt of such a taxonomy 301 for a chocolate-box production process will be discussed and described. When the partner publishes a service, this service is categorized with one of the provided categories if applicable. If the service is one of a new sub-kind ('Provide Decoration Almond'), the partner chooses the next higher category (here 'Provide Decoration') and adds the deviation in a free text form. If a partner thinks a service fits into the picture but no suitable category exists, the service can be described by free text only.

Figure 4:
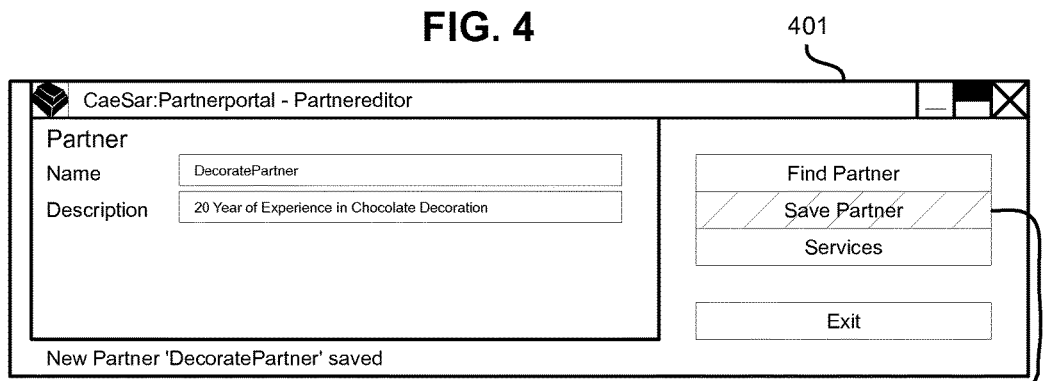
FIG. 4 is a screenshot illustrating the partner-portal accepting a new partner named 'DecoratePartner'.
Figure 5:
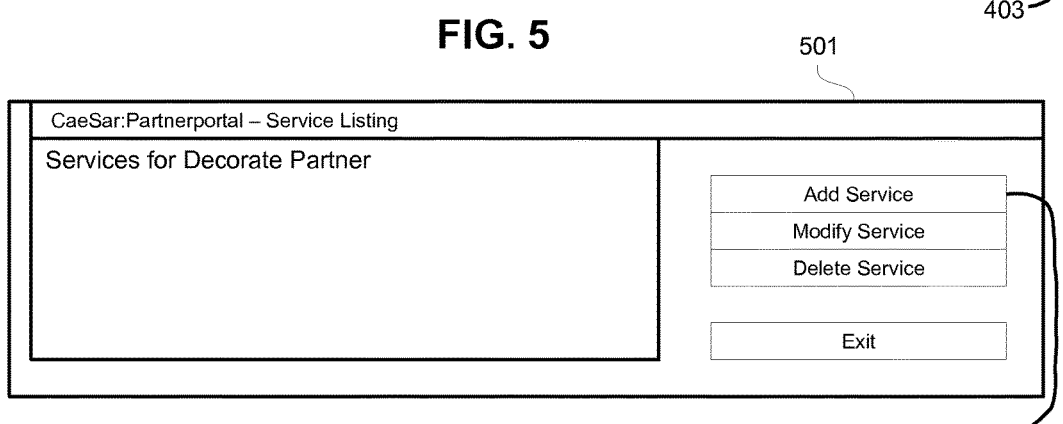
FIG. 5 is a screenshot illustrating the services provided by the new 'DecoratePartner'.
Figure 6:
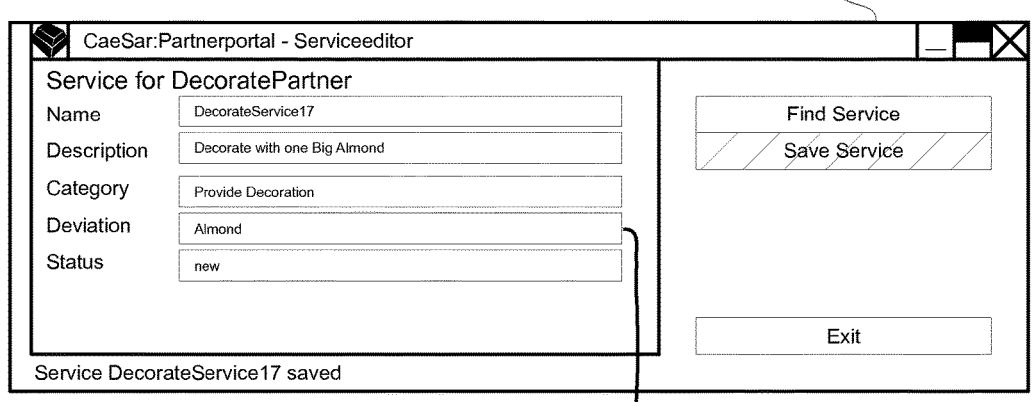
FIG. 6 is a screenshot illustrating a name, description, category, deviation, and status for the new 'DecoratePartner'.

Referring now to FIGS. 4, 5, and 6, screenshots show the partner-portal accepting a new partner named 'DecoratePartner' and its service to decorate a chocolate with an almond. Screen shot 401 exemplifies that the new partner has been saved. Once the new partner has been saved screen shot 501 displays that upon pressing the 'Services' button 403, all services provided by this partner, thus far, are shown. Since the partner has just been added to the system, there are no services displayed yet. Pressing the 'Add Service' button 503 opens the empty service editor. In screen shot 601, a name and a description are provided for this new service. A category is chosen and the deviation between the service and the category is specified in the 'Deviation' field 603.

The status of the newly added service is 'new' meaning that the provider has not yet accepted the service as part of its customer offering and production chain. In the background, the information about a new partner and its service offerings is stored in the database. It is up to the provider whether the new information automatically becomes active in the system and thus eventually visible to other partners and/or customers. Regarding the services offerings, the process of making this active within the system can be dealt with in a semi-automatic manner. Similar to the one described in FIGS. 4, 5, and 6 offers something new, the provider can decide to include the new offering ('Provide Decoration Almond') into the service categorization taxonomy to encourage other partners to also provide this and to make such future offerings machine readable.

In a separate step, the provider can set the new service from 'new' to 'active' so that the new service offering is contained in the customer offering as presented in the customer portal and as part of the process execution later on. If the new service does not yet exactly meet an existing category (i.e. a deviation was entered) it might be necessary for the provider to re-categorize the service to clarify at which exact place in the production process the service is supposed to fit in, especially if no category was chosen.

Figure 7:
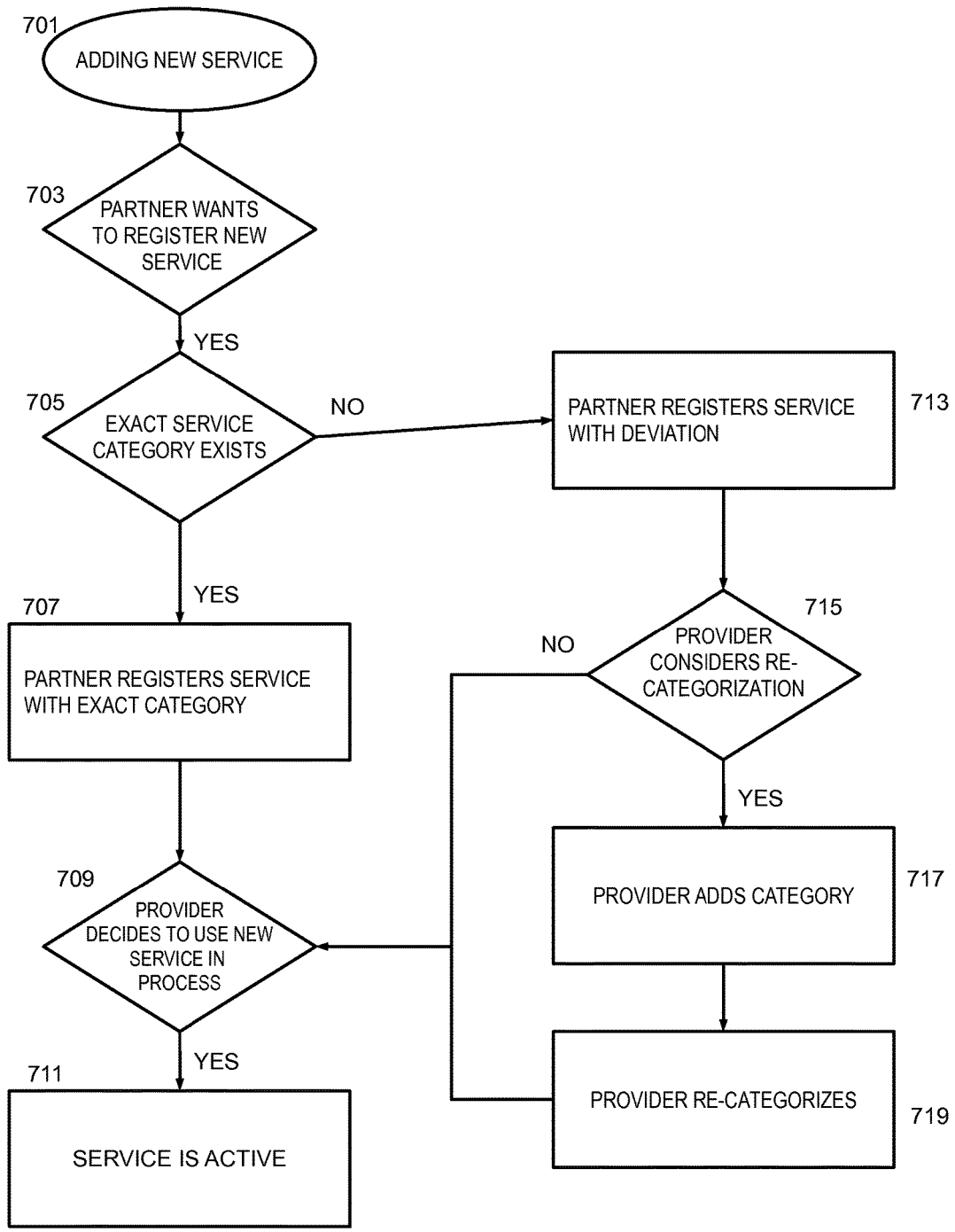
FIG. 7 is a flowchart of the procedure for adding a new service until it becomes a possible part of the overall production process.

Referring now to FIG. 7, a flow chart illustrating the procedure 701 of adding a new service until it becomes a possible part of the overall production process will be discussed and described. In step 703, the partner decides to register a new service. If it is determined in step 705 that the service category exists, then the partner can register the service with an exact category in step 707. In step 709, the provider can decide to use the new service that has been registered by the partner. In step 711, the service becomes active. If, however, it is determined in step 705 that the service category does not exist, then the partner registers the service with 'deviation' in step 713. In step 715, the provider considers whether to amend the categorization of services. If the provider decides not to re-categorize, then the process proceeds to step 709 so that the provider can decide to use the new service process sans re-categorization and then activate the service in step 711. However, if the provider decides to amend the service categories in step 715, then the provider can add the category in step 717, re-categorize in step 719, and then proceed to use the new service in step 709 and activate the service in step 711.

Figure 8:
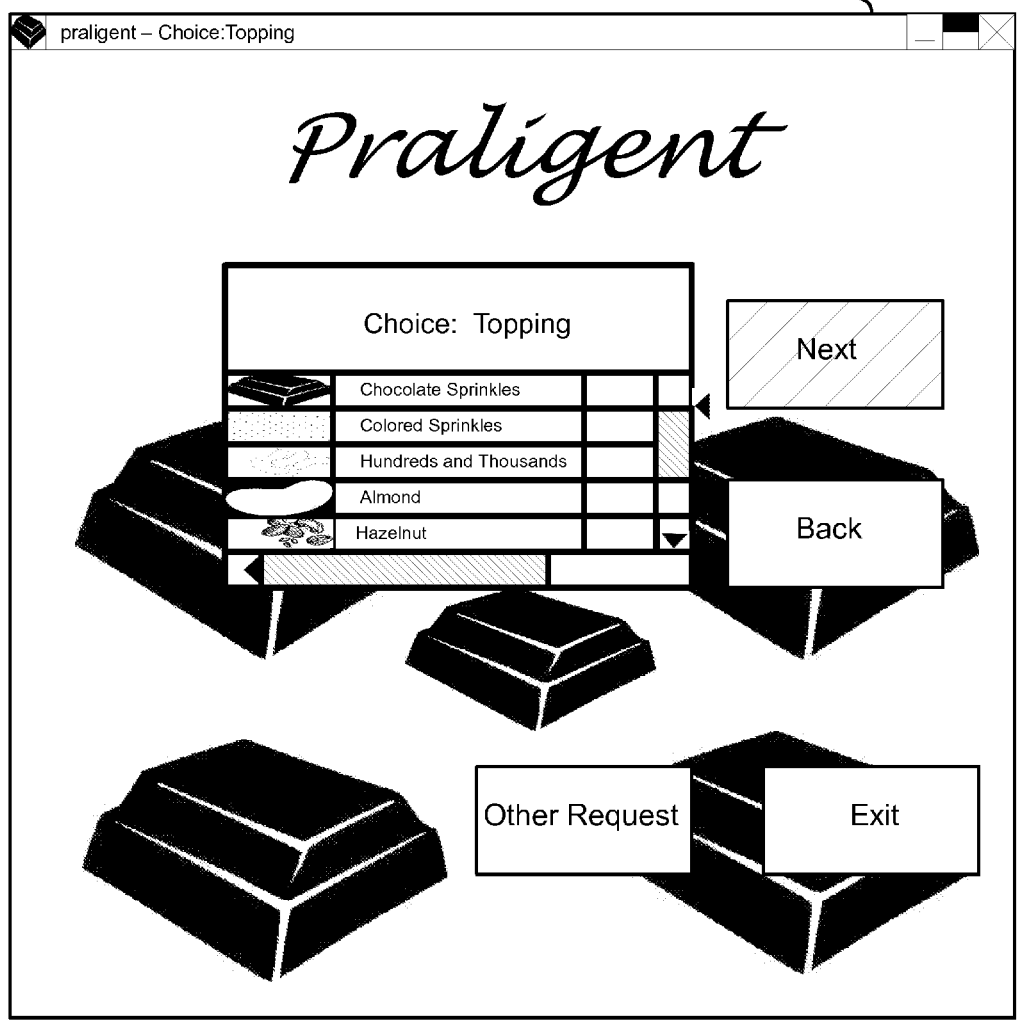
FIG. 8 is a screenshot illustrating the customer-portal for a chocolate boxes production example.

Referring now to FIG. 8, a screenshot 801 shows the customer-portal for the chocolate boxes example. The customer-portal exhibits the aggregated, accepted partner offerings to potential customers. For each step that is part of the overall production process, the customer is offered a unique list of choices that the partners offer, but have not yet been set to active by the provider. A customer can then configure a customized offering by choosing among the options provided by the registered partners for each step. The customer-portal offers all options currently available as a sequence of screens, each screen allowing the selection between one or more options to a certain criterion (body, icing, topping, etc.). Both the sequence of criteria to choose among and the selectable options dynamically depend on the partners' offerings and the steering component's settings. FIG. 8 exemplifies a screenshot of the customer-portal for chocolate boxes and the process step that is being considered for selection is the topping for the chocolates. Using the 'Other Request' button 803, the customer can also specify wishes for a certain category that is not yet contained in the partner's aggregated offerings. The provider deals with these preferences by trying to find a partner that offers such a service either by accepting a service that already offers this or by publishing a suitable request on the partner portal to encourage partners to offer such a service. The provider could encourage the partners in this way by either adding a suitable category to the service categorization taxonomy or actively informing the partners by sending e-mails or publishing such requests on a suitable information board either being part of or existing separately from the partner-portal. It is also possible to address a specific partner that is known to offer the relevant service directly.

As soon as all steps that are currently considered to be part of the overall process are presented to and decided by the customer, the customer is able to view all of the selected aggregated choices and decides whether to send the offering. If the customer is not satisfied with the selected aggregated choices it is possible to go back to any step in the decision process and re-enter the 'send the offering now'-screen later.

There are multiple ways interdependencies between choices for different criteria can become obvious. One option is that the partner already states a restriction when publishing its service, e.g. a partner knows that using its service to form a chocolate body out of marzipan results in something that does not abide icing beyond 60 degrees Celsius. Another more unpleasant way of discovering interdependencies is when a customer orders a bad combination and the processing of this request proves impossible. Either way the interdependency must be noted so that future ordering actions are manageable.

The present ontology-based emergent ordering system represents the interdependencies similar to the service categories described above. Since interdependencies can be more complex than just service category taxonomies, the term "ontology" is used to describe the present system. The service categories are a necessary part of this ontology. Apart from these, the ontology describes rules that must be adhered to for certain production steps and additional parameters that are of interest for services of certain categories.

Similar to the way the service categories are handled, the additional concepts in this ontology may stem from the different sides (partner, provider and customer). As with the service categories, each side may note such issues, but the provider is in charge of the ontology. Issues noticed or brought up can be added to the ontology from the provider's side. It is up to the provider to make these restrictions machine-readable, so that the restrictions provided in a human-readable way as shown in the ontology subset of FIG. 1 can be communicated in a machine-readable statement with the relevant parameters identified. This can be accomplished by storing a list of relevant parameters (such as parameters 103 and 105) within a service category.

With regard to the partner-portal, the provider can influence the appearance of the partner portal according to previously experienced problems. For example, if the temperature a body can endure is often a problem when chocolates get iced, the service provider can always be asked about the temperature restriction of the provided body.

Figure 9:
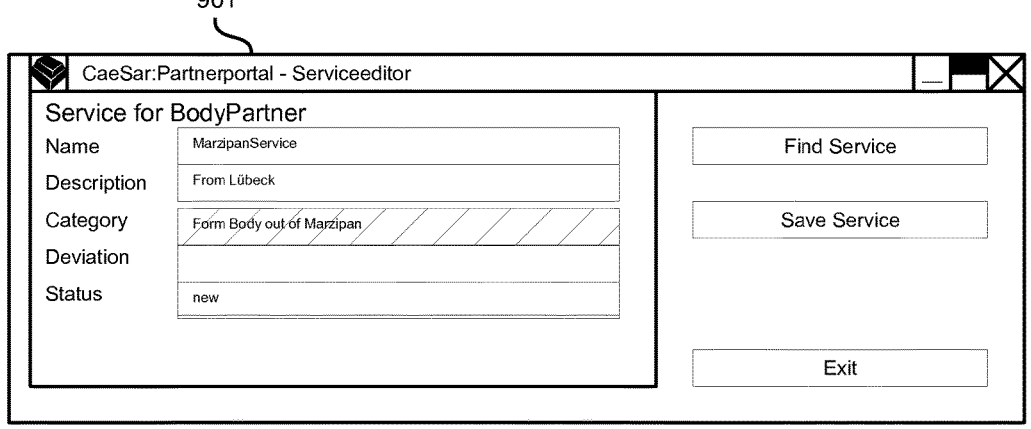
FIG. 9 is a screenshot illustrating a partner 'BodyPartner' that is about to save a service 'MarzipanService' using the partner portal.
Figure 10:
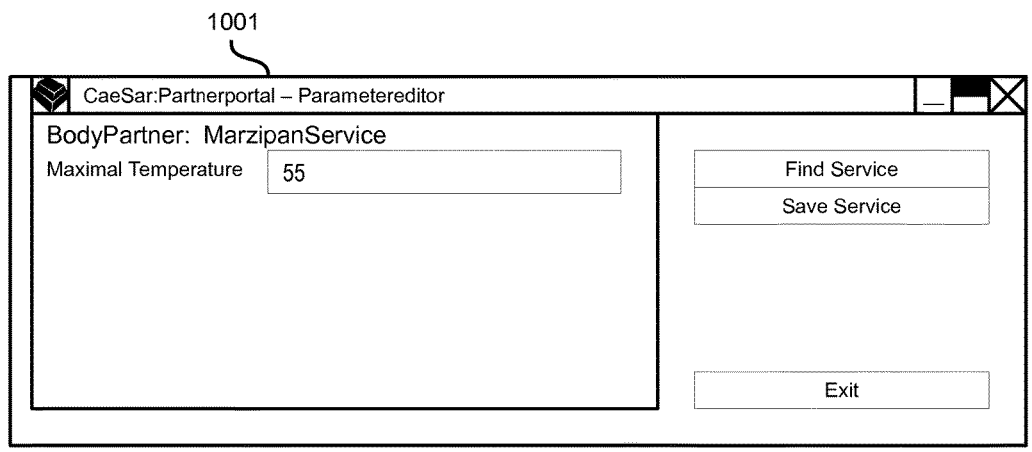
FIG. 10 is a screenshot illustrating maximum temperature information that is being requested from partner 'BodyPartner'.

Referring now to FIGS. 9 and 10, the screenshot 901 shows a partner 'BodyPartner' that is about to save a service 'MarzipanService' using the partner portal, while screenshot 1001 displays information that is being requested from partner 'BodyPartner'. Having added the parameter 'Maximal Temperature' to the ontology as information of interest when entering a service of this category, a menu, for example, a popup, can ask the service provider for this information. Additional settings in the database may qualify this information as either optional or mandatory or might specify a set of values to choose among. In the latter case, the portal would provide a suitable drop down box.

With regard to the customer portal, a customer is prevented from ordering something that is not producible by the current set of available production steps. Alternatively, a warning system may be utilized. The format of the customer choices displayed via the customer portal, the lists of options for each process step, and the customer order produced can be in XML format, therefore XQuery may be used to formulate these restrictions. For complex restrictions, such as 'body.maxtemperature>icing.processingtemperature', XQuery may still be used.

One method of preventing orders that cannot be fulfilled is to use the machine-readable restrictions to exclude options that are impossible due to previous decisions. For example, if the body-decision is presented earlier and the option 'marzipan' was chosen, the icing-decision would not offer the 'dark chocolate' icing option. This can be problematic for two reasons. First, it eventually makes the customer's choice dependent on the sequence in which the seemingly independent choices are presented. Second, it might be irritating for the customer because the restricting factors are not openly laid out, but only appear by a different set of choices when clicking through the different choices backwards and forwards.

Accordingly, it can be preferable to offer all available options (available as decided by the steering-component) and additionally to provide information on possible restrictions (rules). When deciding on marzipan, for example, the customer may be informed that this prevents dark chocolate icing, but the option still occurs and the customer might switch to nougat-body later on. This requires having the machine-readable formulated restrictions also in their human-readable representations. When the customer to-be reaches the 'send the offering now'-screen the aggregated offerings can be presented together with the restrictions encountered by these choices. The option to order the specified product is only offered if no restrictions are encountered.

The mechanism that is used with the taxonomies is also utilized for the entire ontology also containing the restrictions. The dynamic nature of the taxonomy of service categories and the generic architecture of the system's components, allows the overall system to be automatically adapted according to category suggestions from partners and customers eventually after being approved by the provider.

For the ontology this means that the restrictions pertaining to a partner's service offering or a combination thereupon are likewise dynamically dealt with. Partners and customers may make restrictions that become obvious on their respective sides of the overall process known to the system and the provider's approval may make these officially known within the system. The provider's approval in most cases includes a mapping of the means by which the partners and/or customers convey this information to a machine-readable form. If, for example, a customer complains that it is impossible to make sure that the ordered chocolates do not contain bits of a certain allergenic substance, the provider may take this as a hint to establish a field 'may contain bits of hazelnuts' with the 'Form Body' category. As with the service categories, known restrictions may be used by generic system components to suggest likely restriction to the system users. In the hazelnut case, the 'Form Body' service providers are now asked to make a statement about whether they can guarantee the complete absence of hazelnuts.

In the case of possible temperature clashes between chocolate bodies and icings the fact that this problem becomes known and is acknowledged by the provider by representing it in the ontology may lead to the partner portal asking the partners for the respective temperature restrictions when receiving the partner's offerings for body and icing services.

Restrictions as entered and seen by system users are probably in a human-readable form. Thus it is up to the provider when acknowledging a restriction, besides taking care for eventual new parameters to be entered along with the service offerings, to provide a machine-readable form to make the restriction usable when dealing with customer orders. The following is a sample statement in plain text:

If the body can only endure temperatures up to a certain degree the icing can't require more than this temperature to melt.

A corresponding machine-readable query (e.g. in the form of an XQuery) is asked against the result of a customer's ordering procedure which might look as follows:

```
<order>
    <shape>rectangular</shape>
    <body>marzipan</body>
    <icing>white icing</icing>
    ...
</order>
```

The registered partner services may be stored in a conventional meta-data registry, for example a service-oriented architecture (SOA) registry. The registry may also contain the taxonomy of service categories plus the parameters and rules pertaining to the services of the different categories.

Figure 11:
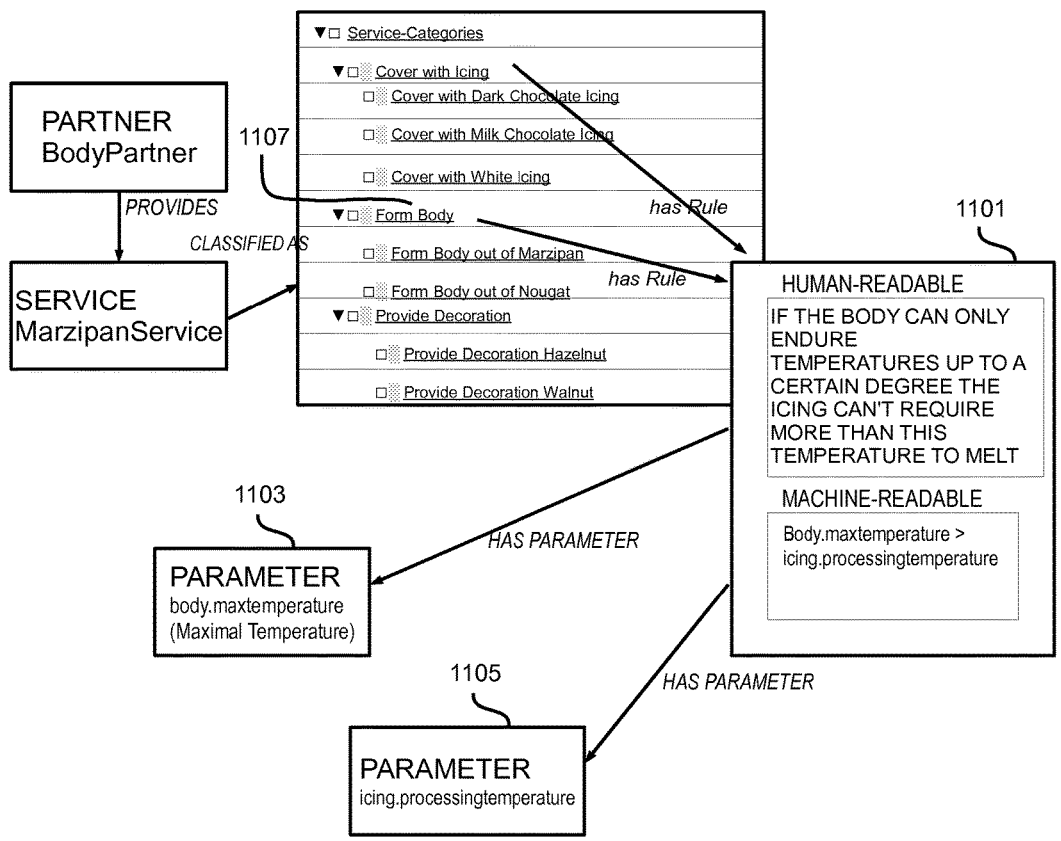
FIG. 11 is a block diagram that depicts an exemplary excerpt of a registry pertaining to the service 'MarzipanService', the category it belongs to, the rules regarding temperatures and the relevant parameters.

Referring now to FIG. 11, a block diagram depicts a possible excerpt of such a registry pertaining to the service 'MarzipanService', the category it belongs to, the involved rules 1101 about the temperatures and the relevant parameters 1103 and 1105.

As noted and manifested by the provider, not only marzipan bodies may be subject to temperature restrictions, but bodies of any material. Thus the rule 1101 about the relation of body and icing temperatures is connected to the 'Form Body' entry 1107. The partner portal asks for the input of parameters if a rule is connected to the actual category or one of its ancestors.

Assume for example that the registry uses JAXR (Java API for XML Registries) as a format. Thus the information about the current restrictions of all services currently registered and necessary for the current order can be assumed to be available in XML. Using XSLT (Extensible Stylesheet Language Transformations) or other known XML-transforming techniques, the necessary information can be brought into a format that is easily usable for order checking, as for example the following:

```
<service>
    <category>Form Body</name>
    <name>body-providing-service1</name>
    <material>marzipan</material>
    <maxtemperature>55</maxtemperature>
    <processingtemperature>15</processingtemperature>
    ...
</service>
<service>
    <category>Form Body</name>
    <name>body-providing-service2</name>
    <material>marzipan</material>
    <maxtemperature>45</maxtemperature>
    <processingtemperature>20</processingtemperature>
    ...
</service>
<service>
    <category>Cover with Icing</name>
    <name>icing-service1</name>
    <material>white icing</material>
    <maxtemperature>90</maxtemperature>
    <processingtemperature>50</processingtemperature>
    ...
</service>
<service>
    <category>Cover with Icing</name>
    <name>icing-service2</name>
    <material>pink icing</material>
    <maxtemperature>120</maxtemperature>
    <processingtemperature>60</processingtemperature>
    ...
</service>
```

An XQuery expression that checks an order for being executable with respect to the body-icing-restriction has to check whether there exists a pair of services (one for the body and the other for the icing) that is compatible temperature-wise.

```
let $order := getActualOrder( )
let $pairs :=
    for $bodyService in collection('services')/service[category= 'Form Body' and material = $order/body]
        for $icingService in collection('services')/service[category= 'Cover with Icing' and material = $order/icing]
            return
                <pair>
                    <t1> { $bodyService/maxtemperature } </t1>
                    <t2> { $icingService/processingtemperature } </t2>
                </pair>
return some $pair in $pairs satisfied $pairs/t1 > $pairs/t2
```

Figure 12:
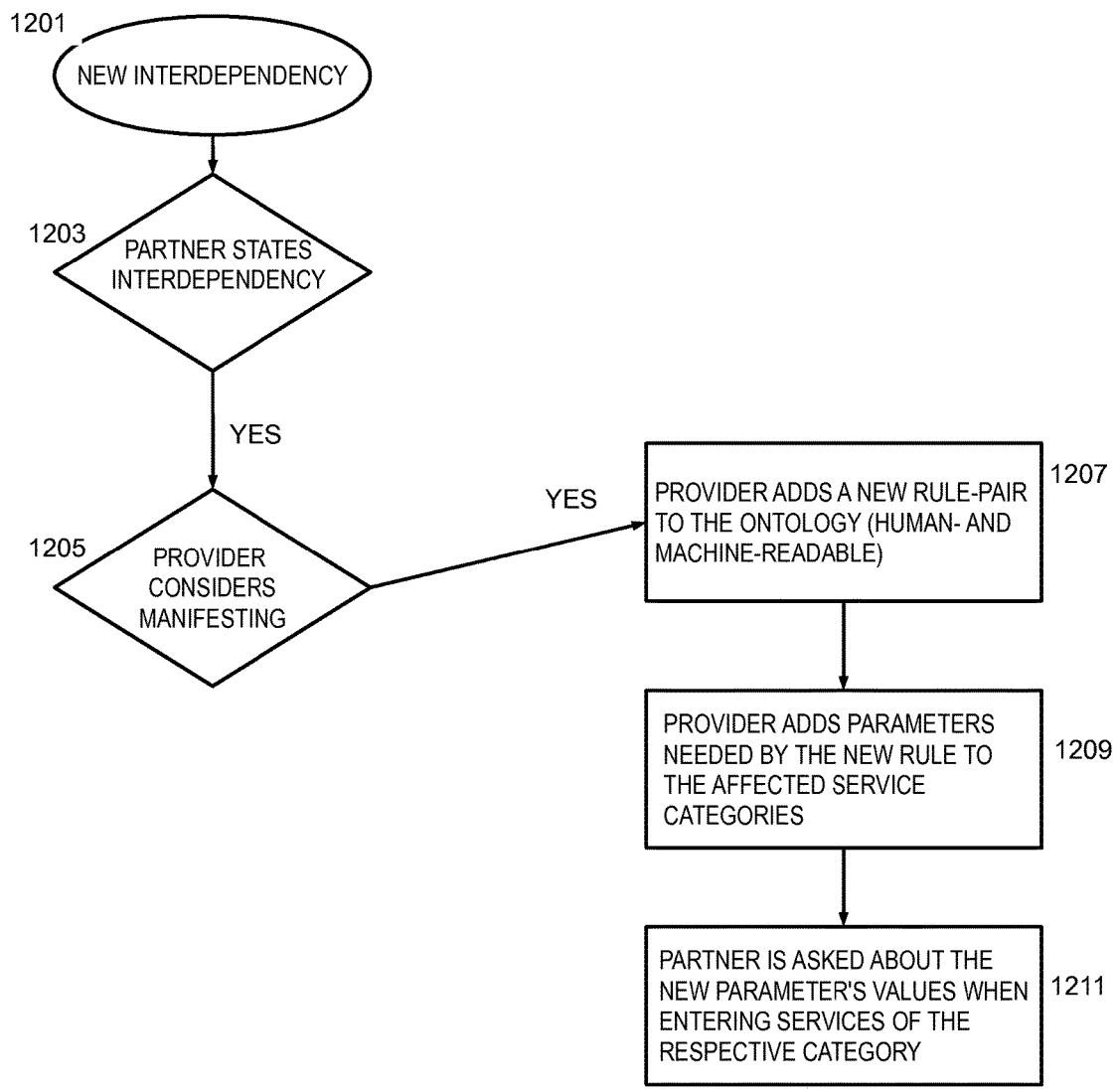
FIG. 12 is a flowchart of the process for encountering and manifesting a new interdependency.
Figure 13:
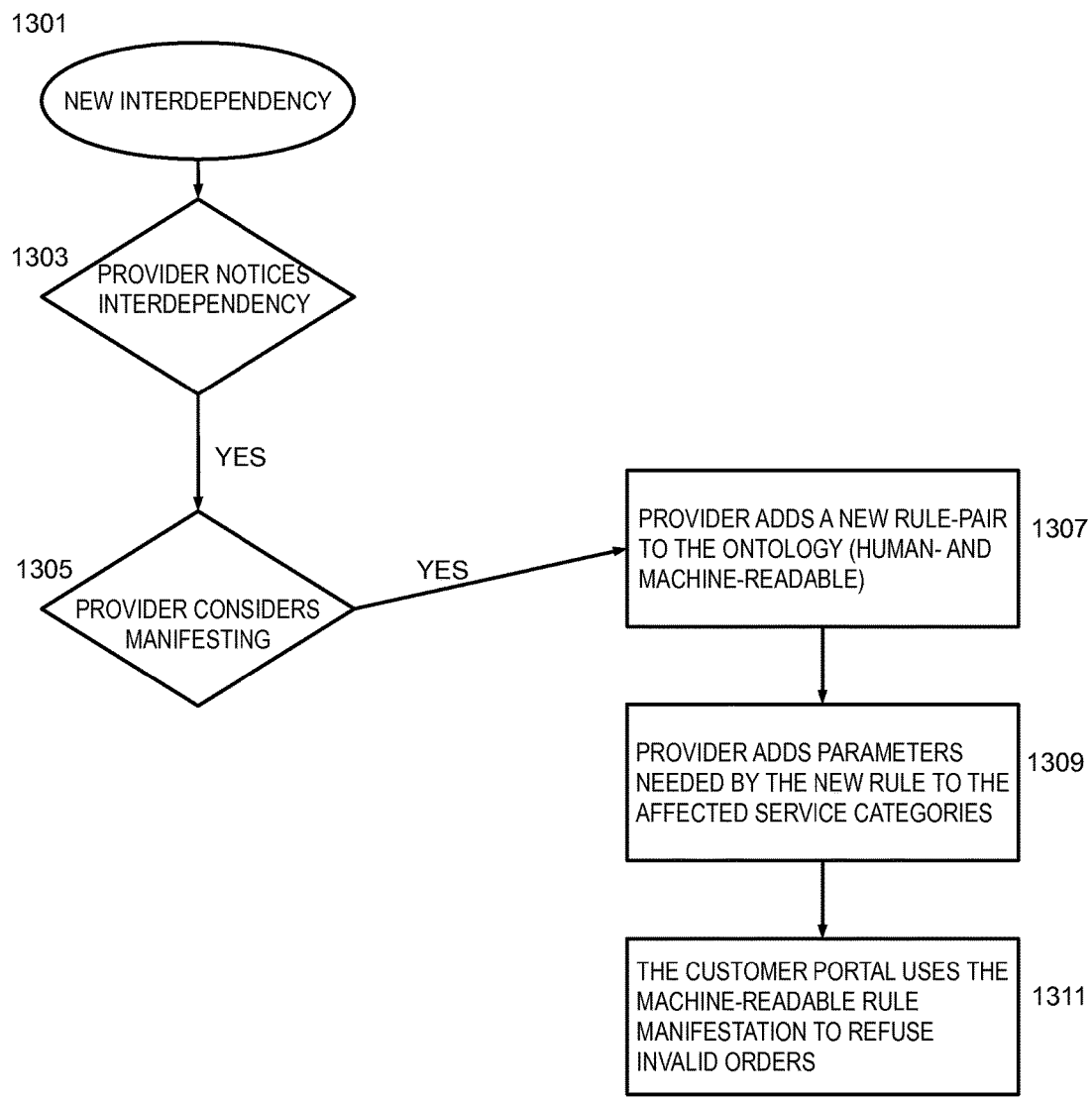
FIG. 13 is a flowchart of a second process for encountering and manifesting a new interdependency.

Referring now to FIGS. 12 and 13, these two flowcharts show the process of encountering and manifesting a new interdependency. In the procedure 1201 in FIG. 12, if the partner states the new interdependency (1203), then the provider considers manifesting (1205) the new interdependency. If the provider decides to manifest the new interdependency, the provider adds a new rule-pair to the ontology in step 1207. The rule-pair is both human-readable and machine-readable. In step 1209, the provider adds parameters needed by the new rule to the affected service categories. The final step 1211 enables the partner to be asked about the new parameter values when entering services of the relevant category.

In the procedure 1301 in FIG. 13, if the provider notices the interdependency in step 1303, then the provider considers manifesting (1305) the new interdependency. If the provider decides to manifest the new interdependency, the provider adds a new rule-pair to the ontology in step 1307. The rule-pair is both human-readable and machine-readable. In step 1309, the provider adds parameters needed by the new rule to the affected service categories. The final step 1311 enables the customer portal to use the machine-readable rule manifestation to refuse invalid orders.

Figure 14:
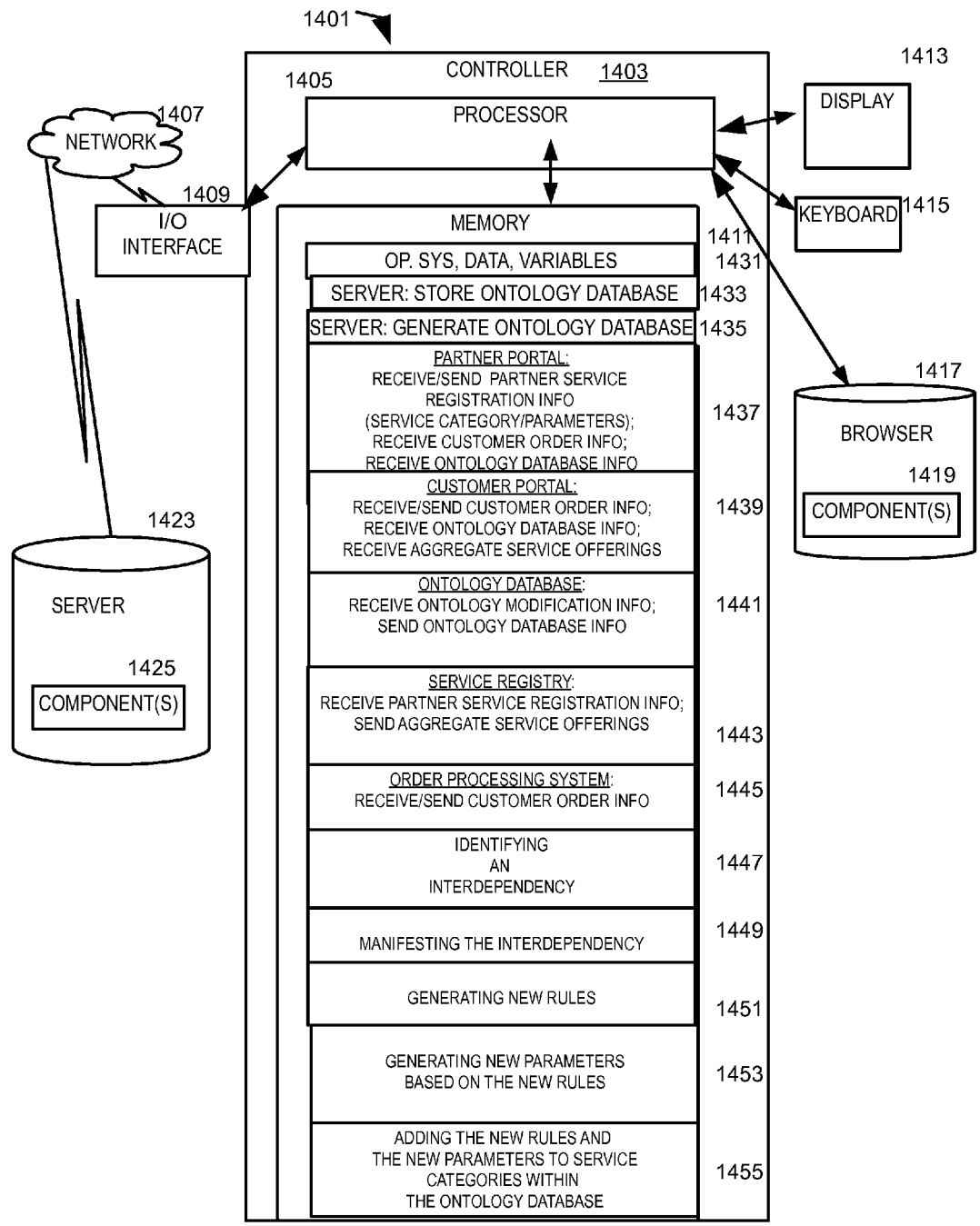
FIG. 14 is a block diagram that depicts relevant portions of a computer system.

Referring now to FIG. 14, a block diagram illustrating relevant portions of a computer system 1401 will be discussed and described. The computer system 1401 may include one or more controllers 1403, a processor 1405, an input/output (i/o) interface 1409 for communication such as with a network 1407, a memory 1411, a display 1413 (optional), and/or a user input device such as a keyboard 1415. Alternatively, or in addition to the keyboard 1415, a user input device may comprise one or more of various known input devices, such as a keypad, a computer mouse, a touchpad, a touch screen, a trackball, and/or a keyboard. The display 1413 may present information to the user by way of a conventional liquid crystal display (LCD) or other visual display, and/or by way of a conventional audible device (e.g., a speaker) for playing out audible messages. Portions of the computer system 1401 are well understood to those of skill in this area and have been omitted to avoid obscuring the discussion.

The processor 1405 may comprise one or more microprocessors and/or one or more digital signal processors. The memory 1411 may be coupled to the processor 1405 and may comprise a read-only memory (ROM), a random-access memory (RAM), a programmable ROM (PROM), and/or an electrically erasable read-only memory (EEPROM). The memory 1411 may include multiple memory locations for storing, among other things, an operating system, data and variables 1431 for programs executed by the processor 1405; computer programs for causing the processor to operate in connection with various functions such as storing 1433 the ontology database; generating 1435 the ontology database; partner portal functions 1437 (receiving/sending partner service registration information, receiving customer order information, receiving ontology database information); customer portal functions 1439 (receiving/sending customer order information, receiving ontology database information, receiving aggregate service offerings); ontology database functions 1441 (receiving ontology modification information, sending ontology database information); service registry functions 1443 (receiving partner service registration information, sending aggregate service offerings); order processing system functions 1445 (receiving/sending customer order information); identifying 1447 an interdependency; manifesting 1449 the interdependency; generating 1451 new rules; generating 1453 new parameters based on the new rules; adding 1455 the new rules and the new parameters to service categories within the ontology database. The computer programs may be stored, for example, in ROM or PROM and may direct the processor 1405 in controlling the operation of the computer 1401. Each of these functions is considered in more detail herein, to the extent that it is not detailed elsewhere in this document.

The user may invoke functions accessible through the user input device such as the keyboard 1415. The user input device may comprise one or more of various known input devices, such as a keyboard (1415, illustrated) and/or a pointing device, such as a mouse; the keyboard 1415 may be supplemented or replaced with a scanner, card reader, or other data input device; and the pointing device may be a mouse, touch pad control device, track ball device, or any other type of pointing device.

Responsive to manual signaling from the user input device represented by the keyboard 1415, in accordance with instructions stored in memory 1411, and/or automatically upon receipt of certain information via the i/o interface 1409, the processor 1405 may direct the execution of the stored programs.

The computer 1401 can utilize a browser 1417, which may include one or more browser component(s) 1419. The browser 1417 can provide a convenient way using known techniques to interact, as further described herein, with a user as a provider via a partner-portal, and/or a user as a customer via a customer-portal.

The computer 1401 can access a server 1423 on which is stored one or more components, here represented by server component(s) 1425. Although the components 1425 are illustrated as accessed over the network 1407, the components 1425 may be remotely and/or locally accessible from the computer 1401, over a wired and/or wireless connection; the components 1425 do not need to be limited to a database or a server. Techniques are known for accessing components located in a server 1423, and the like.

With regard to the server 1423 and browser 1417, it may be noted that the computer programs stored in the memory 1411 are illustrated on the controller 1403. In a client/server embodiment, one or more of the computer programs conveniently may be distributed to the server, such as those marked "SERVER", and one or more of the computer programs conveniently may be distributed to a client side, such as those marked "CLIENT". In such a situation, the server 1423 may omit the client computer programs, and the client may omit the server computer programs. In another embodiment, the computer programs may be included on a non-client-server architecture, and the requests between client-server may be omitted.

The processor 1405 may be programmed 1433 for storing the ontology database. Service categories, rules, and parameters are stored in server storage. Techniques are known for storing databases. The ontology databases can be stored in one or more formats.

The processor 1405 may be programmed for 1435 generating the ontology database. This ontology database can be read from storage, modified, and then returned to the server storage.

The processor 1405 may be programmed 1437 for partner portal functions (receiving/sending partner service registration information, receiving customer order information, receiving ontology database information).

The processor 1405 may be programmed 1439 for customer portal functions (receiving/sending customer order information, receiving ontology database information, receiving aggregate service offerings).

The processor 1405 may be programmed 1441 for ontology database functions (receiving ontology modification information, sending ontology database information).

The processor 1405 may be programmed 1443 for service registry functions (receiving partner service registration information, sending aggregate service offerings).

The processor 1405 may be programmed 1445 for order processing system functions (receiving/sending customer order information).

The processor 1405 may be programmed 1447 for identifying an interdependency.

The processor 1405 may be programmed 1449 for manifesting the interdependency.

The processor 1405 may be programmed 1451 for generating new rules.

The processor 1405 may be programmed 1453 for generating new parameters based on the new rules.

The processor 1405 may be programmed 1455 for adding the new rules and the new parameters to service categories within the ontology database.

As will be understood in this field, besides the functions discussed above, the memory 1411 can include other miscellaneous information in a misc. database, not shown, along with the usual temporary storage and other instructions for other programs not considered herein.

The computer 1401 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 1405, memory 1411, a disk drive and/or removable storage medium are referred to as "computer-readable storage media" and provide non-transitory storage of computer programs and data.

It should be understood that FIG. 14 is described in connection with logical groupings of functions or resources. One or more of these logical groupings may be performed by different components from one or more embodiments. Likewise, functions may be grouped differently, combined, or augmented without parting from the scope. For example, a computer may be programmed with the partner portal 1437, but not the customer portal 1439; and/or may be programmed with the customer portal 1439, but not the partner portal 1437; and/or may include or omit the service registry 1443; or and/or may include the service registry 1443 but one or both or the partner portal 1437 and/or the customer portal; and/or the functions for identifying an interdependency 1447, generating new rules 1451, generating new parameters 1453, and/or adding the new rules 1455 may be omitted from the computer system 1401 and provided on one or more different computer system(s). Similarly the present description may describe various databases or collections of data and information. In some embodiments, the ontology database 1441 may be provided remotely from the system 1401. One or more groupings of the data or information may be omitted, distributed, combined, or augmented, or provided locally and/or remotely without departing from the scope.

Figure 15:
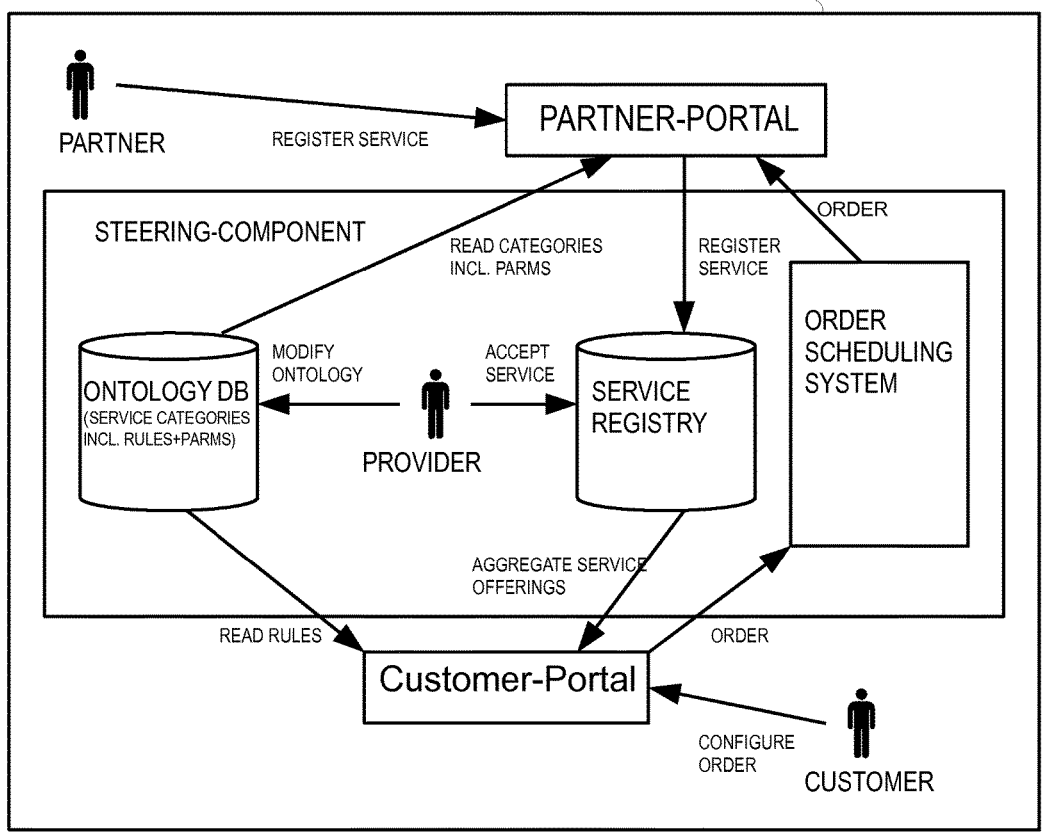
FIG. 15 is a block diagram that depicts the implementation of a system using an Ontology-DB to store the categories including their parameters and the restrictions in both their human-readable and their machine-readable versions.

Referring now to FIG. 15, the block diagram 1501 exemplifies the implementation of such a system using an Ontology-DB to store the categories including their parameters and the restrictions in both their human-readable and their machine-readable versions.

As a special case, the ontology-based emergent ordering system can be configured to check property compatibility based on generic rules, without explicitly specifying the property name in the rule. For this reason, properties could by self-describing, such as in the following example:

```
<service>
    <category>Cover with Icing</name>
    <name>icing-service2</name>
    <matrial>pink icing</material>
    <temperature> <min>60</min> <max>120</max>
    <restriction>overlap</restriction></temperature>
    ...
</service>
```

A generic rule can be used to express: "if there are, in the components to be checked, properties of the same name that carry a 'restriction' attribute, the restriction specified must hold." In the example, this may require that the range specified for temperature must overlap in all components considered if a temperature property is specified for these. Note that the "restriction" need not even be present in all components, and that different components may describe different or multiple restrictions. In this case, the rule could require that all of them hold. As a result, the incompatibility checks performed by the system change dynamically whenever such a self-describing property is added of modified.

Further with regard to the term "ontology", the term "ontology" as used herein refers to the common use of the term in computer science, which is e.g. reflected in the following definition based on Wikipedia:

In computer science and information science, an ontology formally represents knowledge as a set of concepts within a domain, using a shared vocabulary to denote the types, properties and interrelationships of those concepts.

Ontologies are the structural frameworks for organizing information and are used in artificial intelligence, the Semantic Web, systems engineering, software engineering, biomedical informatics, library science, enterprise bookmarking, and information architecture as a form of knowledge representation about the world or some part of it. The creation of domain ontologies is also fundamental to the definition and use of an enterprise architecture framework.

The core meaning within computer science is a model for describing the world that consists of a set of types, properties, and relationship types. There is also generally an expectation that the features of the model in an ontology should closely resemble the real world.

Common components of ontologies may include one or more of:

Individuals: instances or objects (the basic or "ground level" objects).
Classes: sets, collections, concepts, classes in programming, types of objects, or kinds of things.
Attributes: aspects, properties, features, characteristics, or parameters that objects (and classes) can have.
Relations: ways in which classes and individuals can be related to one another.
Function terms: complex structures formed from certain relations that can be used in place of an individual term in a statement.
Restrictions: formally stated descriptions of what must be true in order for some assertion to be accepted as input.
Rules: statements in the form of an if-then (antecedent-consequent) sentence that describe the logical inferences that can be drawn from an assertion in a particular form.
Axioms: assertions (including rules) in a logical form that together comprise the overall theory that the ontology describes in its domain of application. This definition differs from that of "axioms" in generative grammar and formal logic. In those disciplines, axioms include only statements asserted as a priori knowledge. As used here, "axioms" also include the theory derived from axiomatic statements.
Events: the changing of attributes or relations.
Ontologies may be encoded using ontology languages.

From the definition above it is obvious that an ontology might (but need not) comprise rules, however, an ontology is much more than just a rule system because it necessarily comprises types, properties and interrelationships of those concepts, thus modeling semantics of a selected subset of the real or a virtual world.

The detailed descriptions, which appear herein, may be presented in terms of program procedures executed on a computer or a network of computers. These procedural descriptions and representations herein are the means used by those skilled in the art to most effectively convey the substance of their work to others skilled in the art.

Further, an embodiment has been discussed in certain examples as if it is made available by a provider to a single customer with a single site. An embodiment may be used by numerous users, if preferred, and the users can be at one or more sites.

The system used in connection herewith may rely on the integration of various components including, as appropriate and/or if desired, hardware and software servers, applications software, database engines, server area networks, firewall and SSL security, production back-up systems, and/or applications interface software.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

Terms as used herein are intended to be interpreted as understood to one of skill in the arts of computer science and ontologies as understood by one of skill in computer science, instead of as interpreted by a non-computer science dictionary or a more general dictionary.

Furthermore, the networks of interest for communicating between computers onto which some embodiments may be distributed include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), Net BIOS (Network Basic Input Output System), GPRS (general packet radio service), I-mode and other wireless application protocols, and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for handling service interdependencies in an ontology-based emergent environment comprising:
   receiving, by a processor, in a service registry of a steering component, from a partner-portal, partner service registration information which includes, for a service offering, service category information and service parameter information; aggregating, by the processor, the service offerings from partners; and sending, by the processor, the aggregate service offerings to a customer-portal;
   storing, by the processor, in an ontology database, ontology modification information and ontology database information,
   further comprising, in the steering component,
   generating the ontology modification information by interacting with a user to receive, as ontology modification information, for service offering: (i) an identification of an interdependency between the service offering and the service offerings that are from the partners and exist in the ontology database, wherein the interdependency indicates whether properties of two or more of the service offerings that are from the partners and exist in the ontology database are compatible for use together in a single customer order from a customer, in which the single customer order combines the two or more services offerings that are from the partners and exist in the ontology database, (ii) new rules associated with the service offering, for service offerings that exist in the ontology database, wherein the service offerings are interdependent, and (iii) new parameters for the service offerings which are interdependent based on the new rules;
   storing the new rules and the new parameters in the ontology database to service categories within the ontology database which correspond to the service category information from the partner service registration information;
   receiving, by the processor, in an order processing component, from a customer-portal, the single customer order with customer order information which indicates two or more service offerings based on the aggregate service offerings; and
   determining, by the processor, whether the ordered service offerings in the customer order information are an invalid order base on (i) whether the interdependency between the two or more service offerings in the single customer order indicates that the properties of the two or more services offerings in the single customer order are compatible for use together in the single customer order, (ii) rules for the service offerings which are determined to be interdependent and (iii) violations of the parameters in the rules for the service offerings which are determined to be interdependent;
   wherein the aggregate service offerings which are sent to the customer-portal include the ontology database information and the ontology modification information.

2. The method of claim 1, further comprising manifesting, by the processor, in the ontology database, the interdependency between the service offerings as a machine-readable rule with the parameters within the service category.

3. The method of claim 1, further comprising manifesting, by the processor, in the ontology database, the interdependency between the service offerings as a new rule-pair of a human-readable rule and a machine-readable rule.

4. The method of claim 1, further comprising
   receiving, by a customer-portal processor which is complementary to the steering-component, the aggregate service offerings;
   notifying, by the customer-portal processor, a user of all options for service offerings and of restricted options for service offerings based on the rules;
   interacting, by the customer-portal processor, with the user to obtain customer order information which indicates ordered service offerings based on the aggregate service offerings; and
   sending, by the customer-portal processor, the customer order information to the steering component to determine whether the order is invalid based on the ontology database information and ontology modification information.

5. The method of claim 1, further comprising
   interacting, by a partner-portal processor which is complementary to the steering-component, with the user to obtain the partner service registration information;

interacting, by the partner-portal processor, with the user to obtain (i) the identification of the interdependency between the service offerings, (ii) the new rules for service offerings which are interdependent, and (iii) the new parameters for the service offerings which are interdependent based on the new rules.

6. The method of claim 1, wherein
the ontology database information comprises:
   the service categories;
   the rules; and
   the parameters.

7. The method of claim 1, further comprising
receiving, by the processor, a request for a new service;
determining, by the processor, whether a service category for the new service already exists;
when the service category is determined to exist, registering the new service with the service category;
when the service category is determined to not already exist:
   registering the new service as an existing service with a deviation to the existing service;
   interacting, by the processor, with a provider-user to determine whether to add a new category corresponding to the new service;
   activating, by the processor, the new service with the deviation as the new category when the determination is to add the new category; and
   activating, by the processor, the new service categorized as the existing service when the determination is to not add the new category.

8. The method of claim 1, further comprising accepting and adding, by the processor, customer registration information to the aggregate service offerings.

9. A non-transitory computer readable medium comprising executable instructions for execution by a processor, the instructions including a method for handling service interdependencies in an ontology-based emergent environment, the instructions for implementing:
   receiving, in a service registry of a steering component, from a partner-portal, partner service registration information which includes, for a service offering, service category information and service parameter information; aggregating the service offerings from partners; and sending the aggregate service offerings to a customer-portal;
   storing, in an ontology database, ontology modification information and ontology database information,
   further comprising, in the steering component,
      generating the ontology modification information by interacting with a user to receive, as ontology modification information, for the service offering: (i) an identification of an interdependency between the service offering and the service offerings that are from the partners and exist in the ontology database, wherein the interdependency indicates whether properties of two or more of the service offerings that are from the partners and exist in the ontology database are compatible for use together in a single customer order from a customer, in which the single customer order combines the two or more service offerings that are from the partners and exist in the ontology database, (ii) new rules associated with the service offering, for service offerings that exist in the ontology database, wherein the service offerings are interdependent, and (iii) new parameters for the service offerings which are interdependent based on the new rules;
      storing the new rules and the new parameters in the ontology database to service categories within the ontology database which correspond to the service category information from the partner service registration information;
   receiving, in an order processing component, from a customer-portal, the single customer order with customer order information which indicates two or more service offerings based on the aggregate service offerings; and
   determining whether the ordered service offerings in the customer order information are an invalid order based on (i) whether the interdependency between the two or more service offerings in the single customer order indicates that the properties of the two or more services offerings in the single customer order are compatible for use together in the single customer order, (ii) rules for the service offerings which are determined to be interdependent, and (iii) violations of the parameters in the rules for the service offerings which are determined to be interdependent;
   wherein the aggregate service offerings which are sent to the customer-portal include the ontology database information and the ontology modification information.

10. The non-transitory computer readable medium of claim 9, further comprising instructions for manifesting, in the ontology database, the interdependency between the service offerings as a machine-readable rule with the parameters within the service category.

11. The non-transitory computer readable medium of claim 9, further comprising instructions for manifesting, in the ontology database, the interdependency between the service offerings as a new rule-pair of a human-readable rule and a machine-readable rule.

12. The non-transitory computer readable medium of claim 9, further comprising instructions for
   receiving a request for a new service;
   determining whether a service category for the new service already exists;
   when the service category is determined to exist, registering the new service with the service category;
   when the service category is determined to not already exist:
      registering the new service as an existing service with a deviation to the existing service;
      interacting with a provider-user to determine whether to add a new category corresponding to the new service;
      activating the new service with the deviation as the new category when the determination is to add the new category; and
      activating the new service categorized as the existing service when the determination is to not add the new category.

13. An system for handling service interdependencies in an ontology-based emergent environment, comprising:
   a processor configured with a steering-component, the steering component is configured to
      receive, in a service registry, from a partner-portal, partner service registration information which includes, for a service offering, service category information and service parameter information; aggregate the service offerings from partners; and send the aggregate service offerings to a customer-portal;
      store, in an ontology database, ontology modification information and ontology database information, wherein the steering-component is configured to
generate the ontology modification information by interacting with a user to receive, as ontology modification information, for the service offering: (i) identification of an interdependency between the service offering and the service offerings that are from the partners and exist in the ontology database, wherein the interdependency indicates whether properties of two or more of the service offerings that are from the partners and exist in the ontology database are compatible for use together in a single customer order from a customer, in which the single customer order combines the two or more service offerings that are from the partners and exist in the ontology database, (ii) new rules associated with the service offering, for service offerings that exist in the ontology database, wherein the service offerings are interdependent, and (iii) new parameters for the service offerings which are interdependent based on the new rules;
store the new rules and the new parameters in the ontology database to service categories within the ontology database which correspond to the service category information from the partner service registration information;
receive, in an order processing component, from a customer-portal, the single customer order with customer order information which indicates two or more service offerings based on the aggregate service offerings; and
determine whether the ordered service offerings in the customer order information are an invalid order based on (i) whether the interdependency between the two or more service offerings in the single customer order indicates that the properties of the two or more services offerings in the single customer order are compatible for use together in the single customer order, (ii) rules for the service offerings which are determined to be interdependent, and (iii) violations of the parameters in the rules for the service offerings which are determined to be interdependent,
wherein the aggregate service offerings which are sent to the customer-portal include the ontology database information and the ontology modification information.

14. The system of claim 13, wherein the processor is further configured to manifest, in the ontology database, the interdependency between the service offerings as a machine-readable rule with the parameters within the service category.

15. The system of claim 13, wherein the processor is further configured to manifest, in the ontology database, the interdependency between the service offerings as a new rule-pair of a human-readable rule and a machine-readable rule.

16. The system of claim 13, further comprising
the customer-portal which is complementary to the steering-component, and which is configured to
receive the aggregate service offerings;
notify a user of all options for service offerings and of restricted options for service offerings based on the rules;
interact with the user to obtain customer order information which indicates ordered service offerings based on the aggregate service offerings; and
send the customer order information to the steering component to determine whether the order is invalid based on the ontology database information and ontology modification information.

17. The system of claim 13, further comprising
the partner-portal which is complementary to the steering-component, and which is configured to
interact with the user to obtain the partner service registration information;
interact with the user to obtain (i) the identification of the interdependency between the service offerings, (ii) the new rules for service offerings which are interdependent, and (iii) the new parameters for the service offerings which are interdependent based on the new rules.

18. The system of claim 13, wherein
the ontology database information comprises:
the service categories;
the rules; and
the parameters.

19. The system of claim 13, wherein the processor is further configured to
receive a request for a new service;
determine whether a service category for the new service already exists;
when the service category is determined to exist, register the new service with the service category;
when the service category is determined to not already exist:
register the new service as an existing service with a deviation to the existing service;
interact with a provider-user to determine whether to add a new category corresponding to the new service;
activate the new service with the deviation as the new category when the determination is to add the new category; and
activate the new service categorized as the existing service when the determination is to not add the new category.

20. The system of claim 13, wherein the processor is further configured to accept and add customer registration information to the aggregate service offerings.

* * * * *